US010033733B2

United States Patent
Baltzer et al.

(10) Patent No.: US 10,033,733 B2
(45) Date of Patent: Jul. 24, 2018

(54) BIOMETRIC METADATA BUREAU

(71) Applicant: Experian Health, Inc., Franklin, TN (US)

(72) Inventors: Matthew Baltzer, Costa Mesa, CA (US); Elazar Katz, Costa Mesa, CA (US)

( * ) Notice: Subject to any disclaimer, the term of this patent is extended or adjusted under 35 U.S.C. 154(b) by 141 days.

(21) Appl. No.: 15/081,683

(22) Filed: Mar. 25, 2016

(65) Prior Publication Data

US 2017/0279799 A1 Sep. 28, 2017

(51) Int. Cl.
*H04L 29/06* (2006.01)
*G06K 9/00* (2006.01)

(52) U.S. Cl.
CPC ........ *H04L 63/0861* (2013.01); *G06K 9/0008* (2013.01); *G06K 9/00013* (2013.01); *H04L 63/083* (2013.01); *H04L 63/1425* (2013.01)

(58) Field of Classification Search
CPC ............. H04L 63/0861; H04L 63/1425; H04L 63/083; G06K 9/0008; G06K 9/00013
See application file for complete search history.

(56) References Cited

U.S. PATENT DOCUMENTS

| 2010/0177642 | A1* | 7/2010 | Sebastian | H04L 12/1859 370/248 |
|---|---|---|---|---|
| 2016/0048667 | A1* | 2/2016 | Kao | G06F 21/32 726/19 |
| 2017/0140174 | A1* | 5/2017 | Lacey | G06F 21/6245 |
| 2017/0230368 | A1* | 8/2017 | Khan | H04L 63/0884 |

* cited by examiner

*Primary Examiner* — Morshed Mehedi
(74) *Attorney, Agent, or Firm* — Merchant & Gould

(57) ABSTRACT

Biometric markers are seen as a secure and convenient way to control an individual's access to systems. The data that comprise these access controls, however, can be spoofed by nefarious third parties. Therefore, systems and methods are provided that track metadata related to the usage of biometric markers as access control devices to improve the security of systems using biometric markers for access control and to improve the speed and efficiency for systems when re-granting access for an individual in the event that access was revoked or suspended. A bureau collects metadata related to the authentication of individuals via biometric markers and the activities of the individual and the systems accessed. These metadata are used by the bureau to alert affected parties of potential misuse of biometric data and to reduce the processing requirements, storage requirements, and number of communications to on-board or re-authenticate an individual.

20 Claims, 7 Drawing Sheets

US 10,033,733 B2

1

BIOMETRIC METADATA BUREAU

BACKGROUND

Biometric markers are increasingly being used in various industries as a secure and convenient way to authenticate individuals. Biological markers, such as, for example, fingerprints, blood vessel geometries, facial features, iris patterns, retinal patterns, and voice prints, are read by biometric scanners for controlling access to services or locations. These biological markers are seen as more secure and convenient than passwords or Personal Identification Numbers (PIN) for remote authentication of individuals or keys, keycards, or identification cards for local access or identification.

Biometric data are seen as more secure than other methods of authentication because the initial onboarding of data is currently accomplished with a device known to the authenticator, after the individual has already proven their identity by a secondary means. Once a biometric is stored and trusted, it may be used repeatedly on the device without the individual needing to remember passwords, patterns, or multi-factor authentication systems. Additionally, biometric markers are less prone to exposure via social engineering than other access control means. However, as biometric data are beginning to be used for remote logins, and as data breaches begin to spread knowledge of individuals' biometric markers, the security and convenience of biometric data as an authentication factor is under threat.

BRIEF SUMMARY

The present disclosure provides systems and methods for increasing confidence in biometric data on-boarded by devices outside of a user's control for authenticating an individual within the user's domain. The present disclosure's systems and methods further provide increased security for the individual authenticated by biometric data across different domains by tracking how those data are used, and periodically reporting the context of biometric data use. As a result, the present disclosure improves the speed, efficiency, and security of authenticators using biometric markers for access control.

As used herein, the term "individual" refers to a person or animal who will be authenticated via a biometric marker or biometric data, an "authenticator" refers to an entity or system that grants or denies access to the individual based on received biometric data, and the term "bureau" refers to a system that operates between parties in the chain of communications that tracks the use and context of use of the biometric markers to administer metadata related to the biometric data. In various aspects, the metadata include, but are not limited to, the steps taken to verify the individuals during onboarding, the identity of persons or entities who have on-boarded the individuals or their biometric markers, the equipment and capabilities thereof of the devices used when onboarding the individuals, the type of biometric markers authenticated, the frequency of use of the biometric markers, the domains in which the biometric markers are used, the locations in which the biometric markers are used, and where the biometric data are stored.

By using the metadata in conjunction with the presented biological markers, the authenticators who have not on-boarded a given individual may decide whether to trust the biometric marker or biometric data presented by the individual that is alleged to have been properly on-boarded by another authenticator. An authenticator or an individual may also track the reliability and security of biometric data for a given biometric marker from a given source by knowing its use history from metadata administered by the bureau.

The systems and methods provided in the present disclosure overcome problems related to electronic systems by reducing the needs for repeated on-boardings via controlled hardware, storing sensitive information in multiple locations (thus reducing the memory requirements of the electronic systems), and improving the security of biometric markers in remote settings.

Aspects of systems and methods described herein may be practiced in hardware implementations, software implementations, and in combined hardware/software implementation. This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention. In the drawings.

DETAILED DESCRIPTION

Figure 1A:
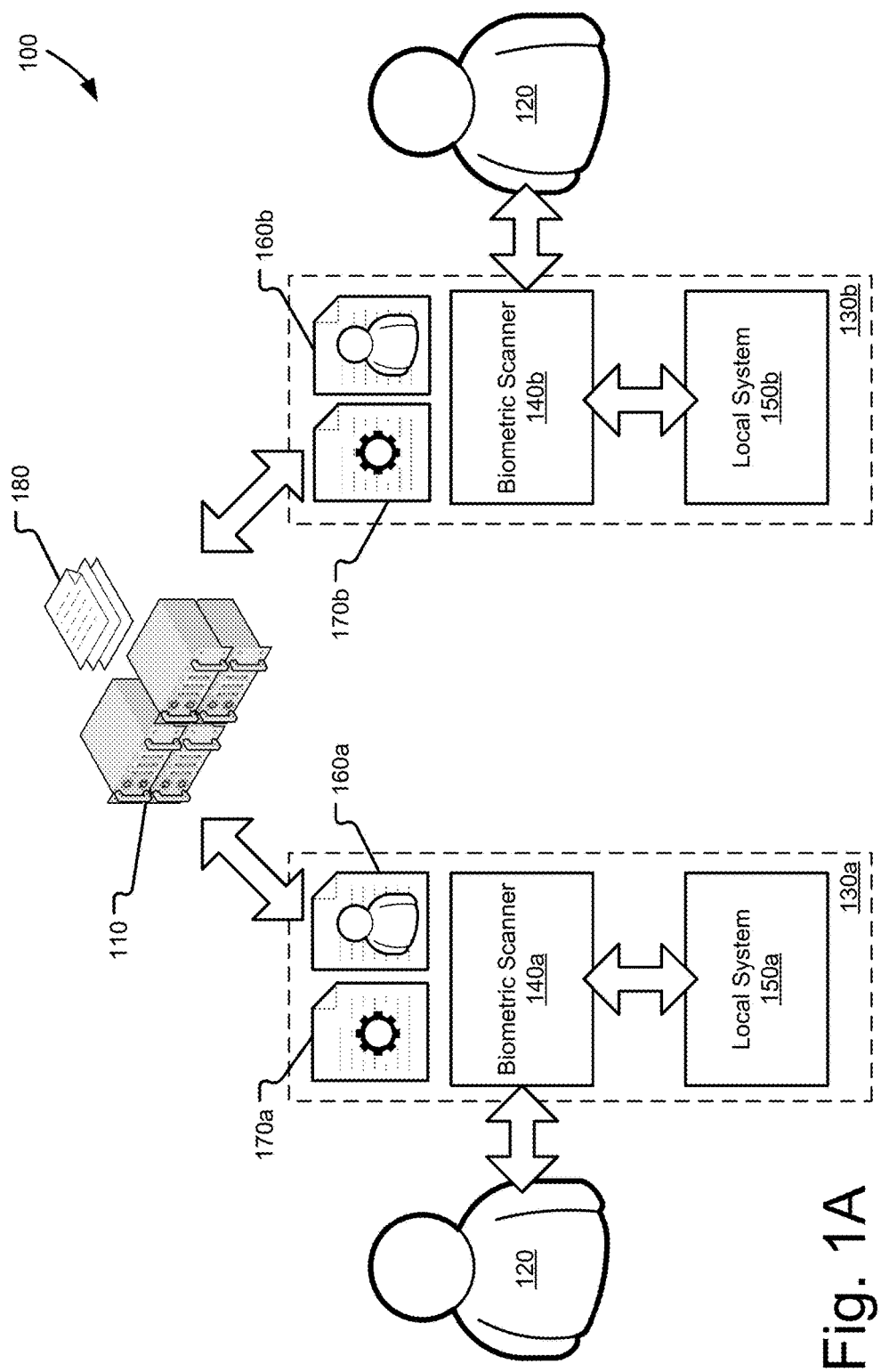
FIG. 1A is a block diagram illustrating an example system using a bureau to improve the reliability and security of systems that use biometric markers locally.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The present disclosure provides systems and methods for increasing confidence in biometric data on-boarded by devices outside of a user's control for authenticating an individual within the user's domain. The present disclosure's systems and methods further provide increased security for the individual authenticated by biometric data across different domains by tracking how those data are used and periodically reporting the context of biometric data use. As a result, the present disclosure improves the speed, efficiency, and security of authenticators using biometric markers for access control.

As used herein, the term "individual" refers to a person or animal who will be authenticated via a biometric marker or biometric data, an "authenticator" refers to a person or entity that grants or denies access to the individual based on received biometric data, and the term "bureau" refers to a system that operates between parties in the chain of communications to track the use and context of use of the biometric markers to administer metadata related to the biometric data. In various aspects, the metadata include, but are not limited to, the steps taken to verify the individuals during onboarding, the identity of authenticator(s) who have on-boarded the individuals or their biometric markers, the equipment and capabilities thereof of the devices used when onboarding the individuals, the type of biometric markers authenticated, the frequency of use of the biometric markers, the domains in which the biometric markers are used, the locations in which the biometric markers are used, and where the biometric data are stored.

By using the metadata in conjunction with the presented biological markers, the authenticators who have not on-boarded a given individual may decide whether to trust the biometric marker or biometric data presented by the individual that is alleged to have been properly on-boarded by another authenticator. An authenticator or an individual may also track the reliability and security of biometric data for a given biometric marker from a given source by knowing its use history (e.g., frequency of use in different systems, whether a system has had a data breach concerning the marker) from metadata administered by the bureau.

The systems and methods provided in the present disclosure overcome problems related to electronic systems by reducing the needs for repeated on-boardings via controlled hardware, storing sensitive information in multiple locations (thus reducing the memory requirements of the electronic systems), and improving the security of biometric markers in remote settings.

FIG. 1A is a block diagram illustrating an example system 100 using a bureau 110 to improve the reliability and security of systems that use biometric markers locally. As illustrated, a first authenticator 130a (generally, authenticator 130) and a second authenticator 130b are in communication with the bureau 110 and with a given individual 120 whose biometric markers are used for authentication. As will be appreciated, although two authenticators 130 are illustrated in FIG. 1A, a given individual 120 may use more or fewer authenticators 130 in conjunction with the bureau 110, and the bureau 110 is operable to serve multiple individuals 120. As will also be appreciated, the system that the individual logs into may be remote to the individual 120, which is discussed in greater detail in regard to FIG. 1B, and the terms "local" and "remote" are relative terms of location based on the individual 120 (and biometric scanner 140) compared to the system using biometric markers as part of an access control scheme.

Each locally implemented authenticator 130 includes a biometric scanner 140 and a local system 150 to which the individual 120 is granted or denied access based on the provided biometric marker. For example, a first authenticator 130a may be a smartphone, which uses its camera as its biometric scanner 140a to grant the individual 120 access to the local system 150a of the smartphone. In another example, a second authenticator 130b may be a laptop computer, which uses a thumbprint reader as its biometric scanner 140b to grant the individual 120 access to the local system 150b of the laptop's operating system. If the individual 120 provides the correct biometric marker to the biometric scanner 140, the individual 120 will be authenticated by the authenticator 130, and granted appropriate access to the local system 150. However, if the individual 120 does not provide the correct biometric marker to the biometric scanner 140, the individual 120 is denied access to the local system 150.

In various aspects, more than one biometric scanner 140 and more than one local system 150 may be part of device used as an authenticator 130. For example, a computer may have a camera, a microphone, and a thumbprint scanner, that can be used as biometric scanners 140. A given device may also have multiple local systems 150 to which it grants access via a single biometric marker or via separate biometric markers. For example, a computer may provide access to a local system 150 of an operating system via a first biometric marker and automatically provide access to a first program (a second local system 150) via the first biometric marker, but a second program (a third local system 150) may require a second biometric marker for access. Similarly, remote systems 155, which are discussed in regard to FIG. 1B, may also reuse biometric markers between systems or have different requirements for a biometric marker and therefore require a different biometric marker for access.

To determine whether a biometric marker is "correct" and whether to authenticate an individual 120 to provide access to a system, the individual 120 must first be on-boarded by the authenticator 130. As will be appreciated, on-boarding is a registration process that links an individual's access rights to a biometric dataset 160. An individual 120 may be on-boarded when an account for the individual 120 is first created, or when a new biometric dataset 160 replaces an existing biometric dataset 160. For example, when an individual 120 first purchases a smartphone, the individual 120 may be prompted to set up an access-restriction scheme (e.g., a password, a personal identification number (PIN), a secret pattern, a biometric marker). If the individual 120 selects a biometric marker to be used as part of an access restriction scheme, the individual 120 will have the selected biometric marker read by the biometric scanner 140 and converted into a biometric dataset 160. The biometric dataset 160 is stored by the authenticator 130 so that when the individual 120 has the biometric marker scanned subsequently, the results can be compared to the stored biometric dataset 160 to determine whether the scanned biometric marker matches the biometric dataset 160 and the individual 120 should therefore be granted access. Accurately matching a marker with an individual 120 is important, so that one individual 120 cannot gain access to another's accounts and profiles and the individual 120 can reliably gain access to the correct accounts and profiles. Therefore, the biometric scanner 140 may include various subsystems and processes to ensure that a presented biometric marker yields a biometric dataset 160 of sufficient detail and clarity to accurately match with a unique individual 120. It is therefore assumed in the present disclosure, that unless state otherwise, the biometric dataset 160 accurately maps to one individual 120; otherwise the systems will reject the scanned biometric marker and request a rescan or alternative/additional authentication (e.g., a different biometric marker, username/password pair, PIN).

When on-boarding for a personal system, such as a smartphone, no supplemental authentication is needed, because individuals 120 know who they are; they are able to self-authenticate before on-boarding. When on-boarding for a shared system, such as a building's security system, however, additional authentication of the individual's identity may be required. For example, the individual 120 may present photo identification to a system administrator before the system administrator will allow the individual's biometric marker to be on-boarded as the biometric dataset 160. What is on-boarded as the biometric dataset 160 will vary based on the biometric marker(s) used, and the capabilities of the biometric scanner 140 used to onboard the biometric dataset. For example, the biometric dataset 160 may store an entire scan of the biometric marker, or may be a compressed reading of the biometric marker, such as a graph or a code based on the biometric marker, and the algorithms used to analyze and compress the scans (and the starting resolutions of the scans) may vary between authenticators 130.

How the authenticator 130 authenticates the individual 120 is represented by an authentication dataset 170. An authentication dataset 170 includes the metadata for the initial access conditions on how the biometric dataset 160 is generated and how a biometric marker is checked against the biometric dataset 160 for a given authenticator 130. For example, the authentication dataset 170 may specify the resolution of a camera, the gain of a microphone, the bits-per-second of a sound recording, the sensitivity of a touch panel, etc., used as a biometric scanner 140, a number of data points used in a biometric dataset 160, the file format in which the biometric dataset 160 is stored, which biometric markers are checked by an authenticator 130, what information (e.g., driver's license, passport, personal recognition, nothing) was checked by a third party to authenticate the individual 120, the permissiveness of authentication procedures (i.e., how different a presented biometric marker can be from the on-boarded biometric dataset 160 to still be correct), etc. The authentication dataset 170 is specific to each authenticator 130, such that a first authentication dataset 170a is associated with a first authenticator 130a and a second authentication dataset 170b is associated with a second authenticator 130b.

The bureau 110 is in communication with the authenticators 130, and is operable to receive the authentication dataset 170 from each authenticator 130 to build a meta dataset 180. The meta dataset 180 includes information on the access conditions for the use of the biometric marker, for example, about the frequency of use of a given authenticator 130, the frequency of use of a given biometric marker, the frequency of use of a given biometric dataset 160, where the authentications took place (e.g., a geographic location or business), who requested the authentication (e.g., personal use, access to a third party system, identity verification), how the biometric marker and the individual 120 were on-boarded, the domain or system that authentication granted access to, whether the authentication was successful, how many attempts were made for successful authentication, and security of the authentication (e.g., encryption used to store the biometric dataset 160, who stores the biometric dataset 160, encryption used to transmit the biometric dataset 160, to whom the biometric dataset 160 has been transmitted).

With the collected meta dataset 180, the bureau 110 is operable to communicate with the authenticators 130 to improve the security and reliability of the biometric datasets 160 used by the authenticators 130. To illustrate this improvement, consider an example in which a first authenticator 130a is a personal smartphone and a second authenticator 130b is a business smartphone used by the same individual 120. In this example, when the meta dataset 180 indicates to the bureau 110 that business smartphone requires an encrypted storage for its biometric dataset 160b, but that the first biometric dataset 160a is stored by the first authenticator 130a in an unencrypted format (or with encryption that fails to meet the encryption requirements for the second authenticator 130b), the second authenticator 130b will be alerted to require the individual 120 to use a different biometric marker from that used for the first authenticator 130a to generate the second biometric dataset 160b. By requiring a different biometric marker for authentication, the second authenticator 130b can ensure the security of the domain to which it grants access is not compromised by the lax security of other authenticators 130. As will be appreciated, a bureau 110 provides other improvements to the security and functionality of systems using biometric markers as an access restriction tool.

Figure 1B:
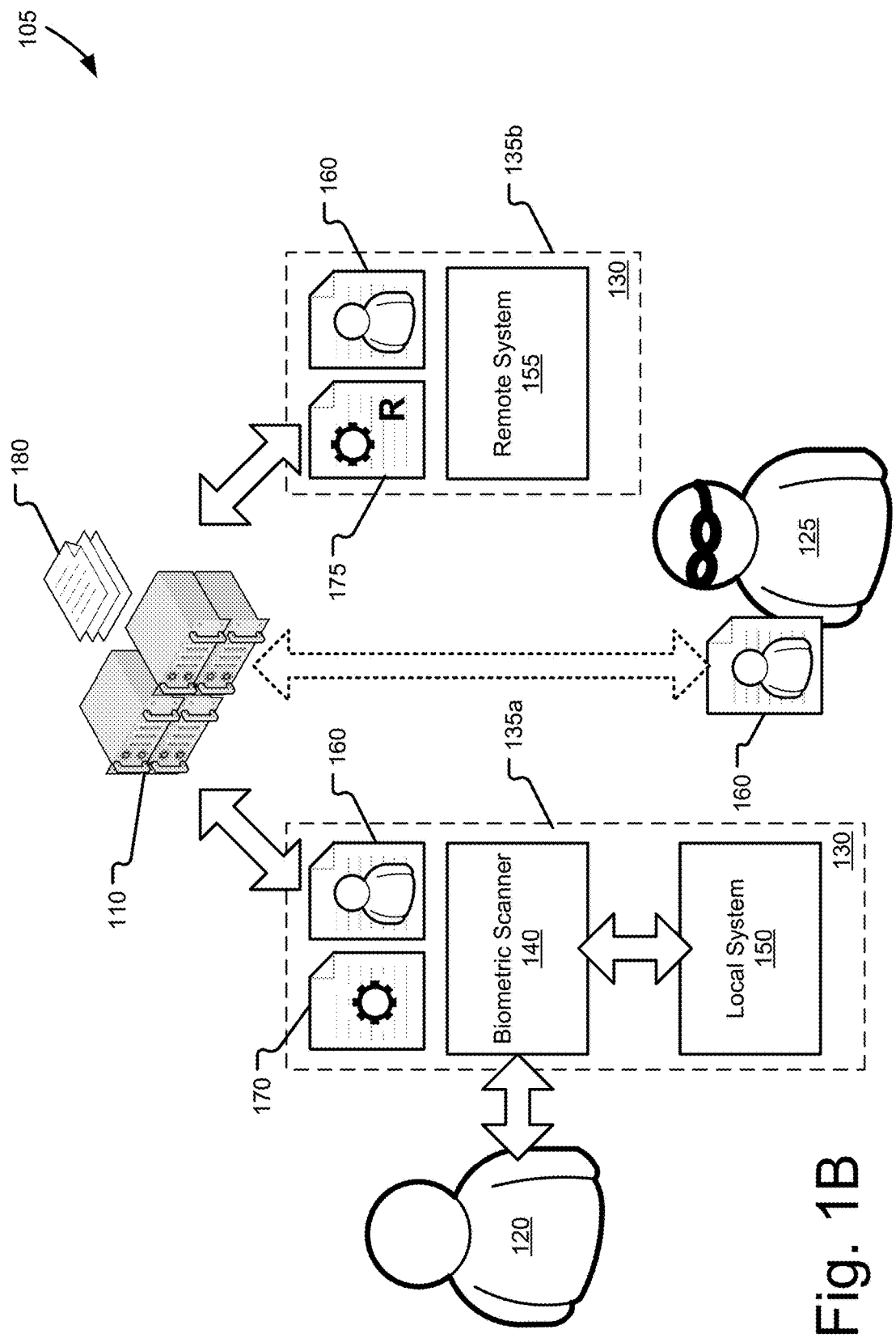
FIG. 1B is a block diagram illustrating an example system using a bureau to improve the reliability and security of a system that uses biometric markers remotely.

FIG. 1B is a block diagram illustrating an example system 105 using a bureau 110 to improve the reliability and security of a system that uses biometric markers remotely. As illustrated, an authenticator 130 is broken into two components; a portion local to the individual 120 (the local portion 135a), which includes a biometric scanner 140, and a portion remote to the individual 120 (the remote portion 135b), which includes the remote system 155 that the individual 120 seeks to access. Each of these portions are in communication with the other via a network, such as the Internet or an intranet, and the bureau 110 is disposed of between the portions so that communications between the portions are monitored to further build the meta dataset 180. Although only one local portion 135a is illustrated, it should be understood that a remote system 155 may be accessed by several different devices acting as local portions 135a in different configurations of an authenticator 130. For example, a given individual 120 may access a remote system 155 of an email server via a smartphone or a desktop computer, wherein both of these example devices act as the local portion 135a to the remote portion 135b that includes the example email server. The local system 150 of a local portion 135a in these examples may include master systems (e.g., an operating system) and subsystems (e.g., email clients, online banking applications, health record lookup systems, tax preparation software) that are used to access and communicate with the remote system 155.

The bureau 110 is located in the path of communications between remote systems 155 and local systems 150, and is operable to communicate with each individually and monitor communications over the network between systems. In various aspects, monitoring the use of biometric markers entails monitoring the location of a biometric scanner 140 when a biometric marker is presented (e.g., an Internet Protocol (IP) address, a business name and address, cell-tower derived coordinates, global positioning system (GPS) coordinates, a network providing access to the Internet), a time when the biometric marker is presented, a frequency of presentation (or of rejection), a device from which the biometric dataset 160 is sent, an individual 120 associated with the biometric dataset 160, and the frequency and duration of communications between the local portion 135a and the remote portion 135b. In further aspects, the bureau 110 may inspect the biometric dataset 160 and the communications between the local portion 135a and the remote portion 135b to determine the types of actions taken by the individual 120 regarding the remote system 155, which biometric dataset 160 is being used, whether additional authentication is used, and when access is terminated (e.g., a timeout event, a logout request, a transactional security violation). The usage data are collected and made part of the meta dataset 180 so that patterns and data regarding the use of the biometric marker (e.g., the access conditions) are available to the bureau 110. In various aspects, information comprising the meta dataset 180 is extracted from the header information of communications, which indicate message source, message destination, time of transmission, etc.

In various aspects, a local portion 135a may be part of multiple authenticators 130, both local and remote. For example, an individual 120 may use a smartphone's camera or touch screen to log in to the phone, making the smartphone a local authenticator 130 for the local system 150 of the smartphone, and the individual 120 may use the smartphone's camera or touch screen to log in remotely to an email service, making the smartphone a local portion 135a and the email server the remote portion 135b of a remote authenticator 130.

Because the local system 150 knows the hardware capabilities of the biometric scanner 140 available to it, while a myriad of biometric scanners 140 with different capabilities may attempt to authenticate an individual 120 with a remote system 155, the remote system 155 may specify what biometric datasets 160 are allowable to authenticate an individual 120 via authentication requirements 175. In various aspects, the authentication requirements 175 set which biometric datasets 160 are insufficiently complex (or too complex) to authenticate an individual 120 and the on-boarding procedures needed to confirm the identity of an individual 120 before access will be granted for the remote system 155. For example, a remote system 155 may set authentication requirements 175 that a biometric scanner 140 must scan a certain biometric marker and have a certain level of detail in that biometric marker and that a trusted party confirms that the individual 120 is who they claim to be (e.g., the trusted party on-boarded the individual 120).

Additionally, the authentication requirements 175 may specify how an individual 120 accesses a master system to the subsystem that grants access to the remote system 150. For example, a Virtual Private Network (VPN) client is a subsystem to a master system of an operating system, and the authentication requirements 175 for the remote system 155 that the VPN client connects to may specify security requirements for the VPN client and for the operating system. The bureau 110 is operable to communicate the authentication dataset 170 from the meta dataset 180 for the local systems 150 and other remote systems 155 to a given remote portion 135b so that it may restrict access to its systems in accordance with its authentication requirements 175. The bureau 110 is further operable to compare the authentication dataset 170 of a local portion 135a to the authentication requirements 175 of a remote portion and to recommend alternative devices available to the individual 120 or changes in authentication procedures with the same device for the individual 120 so that the individual 120 can meet the authentication requirements 175 with a given device. For example, when the authentication requirements 175 specify that the local system 150 acting as a master system must be accessed by an access control scheme (i.e., the individual 120 cannot leave the device unlocked; a password, PIN, pattern, or biometric marker must be used) before a subsystem granting accessing to the remote system 155, the bureau 110 will recommend to the individual 120 an appropriate access control to use for the master system and for the subsystem.

Because the remote system 155 is not part of the same device as the biometric scanner 140, the bureau 110 is operable to track and manage the various authentication requirements 175 of remote systems 155. To ensure that the biometric scanner 140 collects a biometric dataset 160 that meets with the needs of the remote system 155, the remote system 155 sets authentication requirements 175, which are shared with the local portion 135a that specify what sort of biometric dataset 160 is required for an individual 120 to be authenticated by the remote system 155. In various aspects, the capabilities of the biometric scanner 140 (e.g., the Samples per Inch (SPI) of a scanner, the megapixels and color encoding of a digital camera, the sensitivity of a microphone) may be determined to meet or fail the authentication requirements 175. The authentication requirements 175 may also specify how the individual 120 is to be on-boarded, including trusted parties that may on-board an individual 120 and procedures to verify the identity of the individual 120.

Authentication requirements 175 for access to the remote system 155 are set by the remote portion 135b which describes what authentication datasets 170 are acceptable by the remote system 155. For example, the remote system 155 may require the use of a given biometric marker, or require that a given on-boarding process be used, and the biometric scanner 140 may be capable or incapable of meeting the authentication requirements 175. The bureau 110 provides additional data to the remote portions 135b related to knowledge of previously lost/stolen biometric datasets 160 and preferences for the individuals 120 attempting to use the remote system 155 to further improve security and reliability of the authentication requirements 175.

Remote systems 155 and local systems 150 may have different authentication requirements 175 for a biometric marker to be used for access control. When multiple systems share compatible authentication requirements 175, the bureau 110 may automatically log the individual in to multiple remote systems 155. For example, when a smartphone uses a first biometric marker to log in to the operating system of the smartphone, and an application running on the smartphone also uses the first biometric marker to log in to a remote system 155, the bureau 110 may receive the biometric dataset 160 when the individual 120 logs in to the smartphone, and transmit the biometric dataset 160 to the remote system 155 to log the individual 120 in there as well. Alternatively, if the remote system 155 requires a second biometric marker, the bureau 110 may decline to automatically log the individual in to the remote system 155, and the individual 120 will still need to present the second biometric marker for access to be granted to the remote system 155.

One potential vulnerability inherent to remote systems 155 is the ability for an identity thief 125 to gain access to the biometric dataset 160 and impersonate the individual 120 at the remote system 155. As will be known to those of ordinary skill in the art, to reduce the risk of theft of data (or the usefulness of stolen data) the biometric datasets 160 may be stored in an asymmetric encrypted state, for example, in a hashed or salted state, so that the biometric dataset 160 appears differently when stored on the local portion 135a than when stored on the remote portion 135b. These methods are not foolproof however, especially when the identity thief 125 has previously gained access (physical or digital) to devices comprising the local portion 135a (e.g., a biometric scanner 140, a cellphone, computer, etc.). Once an identity thief 125 has gained access to a local portion 135a that currently has been granted access to the remote portion 135b (e.g., by stealing a computer, smartphone, or other device while the individual 120 has logged in) or has the biometric dataset 160 that will be sent from the local portion 135*a* (e.g., via a man-in-the-middle attack) and can spoof a successful presentation of a biometric marker, the only ways to prevent the identity thief 125 from performing actions as the individual 120 are to directly contact the remote system 155 to log out the individual 120 (e.g., via a phone call or a theft alert system requesting logout) or for the transaction safety systems of the remote system 155 to activate (e.g., number of emails per second limits, spending limits, asset transfer limits). One of ordinary skill in the art will be familiar with various direct contact and transaction safety systems.

By being disposed of between the local portion 135*a* and the remote portion 135*b* of an authenticator 130, the bureau 110 is operable to detect use deviations of the biometric dataset 160 with greater reliability and finesse than current transaction safety systems. Because the meta dataset 180 for a given individual 120 from multiple local portions 135*a*, remote portions 135*b*, and authenticators 130 that are entirely local by observing communications between systems and obtaining authentication datasets 170, a meta dataset 180 that encompasses all of the use information/access conditions for an individual 120 is created. By using the meta dataset 180 for an individual 120, the bureau 110 is operable to determine the use patterns for an individual 120 and to determine when a use of the remote system 155 deviates from those use patterns. For example, when a login request is sent from a device with an unknown device identifier (e.g., Media Access Control (MAC) address, serial number, etc.), such as for example, a new device associated with the individual 120 or a device associated with an identity thief 125, the bureau 110 will note that a use deviation has occurred. Similarly, location of login, time of login, other devices simultaneously logged in, number of tries to log in, activities taken while logged in (e.g., purchase size, frequency of messages sent, shipping address information, etc.), and combinations thereof can be used by the bureau 110 to determine when the actions taken by a person attempting to log in, or take actions while logged in, deviate from the use history as indicated by the meta dataset 180.

When a use deviation is detected, the bureau 110 is operable to communicate with affected authenticators 130 to prevent or mitigate unauthorized access or use. In various aspects, the affected authenticators 130 are those systems, remote or local, that use a common biometric marker, biometric dataset 160, or can be accessed through a shared master system. For example, when a use deviation is detected for a system that uses a first biometric marker for access control, all other systems known to the bureau 110 to use that first biometric marker may be contacted so that they will not grant access via the first biometric marker until the use deviation is resolved or an alternate authentication is supplied. Similarly, once a use deviation is learned of, such as, for example, a data breach in which an identity thief 125 gained access to several biometric datasets 160, an individual 120 and remote systems 155 may be alerted to the use deviation so that the biometric marker from which the stolen biometric dataset 160 was generated will not be used in the future for a given individual 120.

Figure 2:
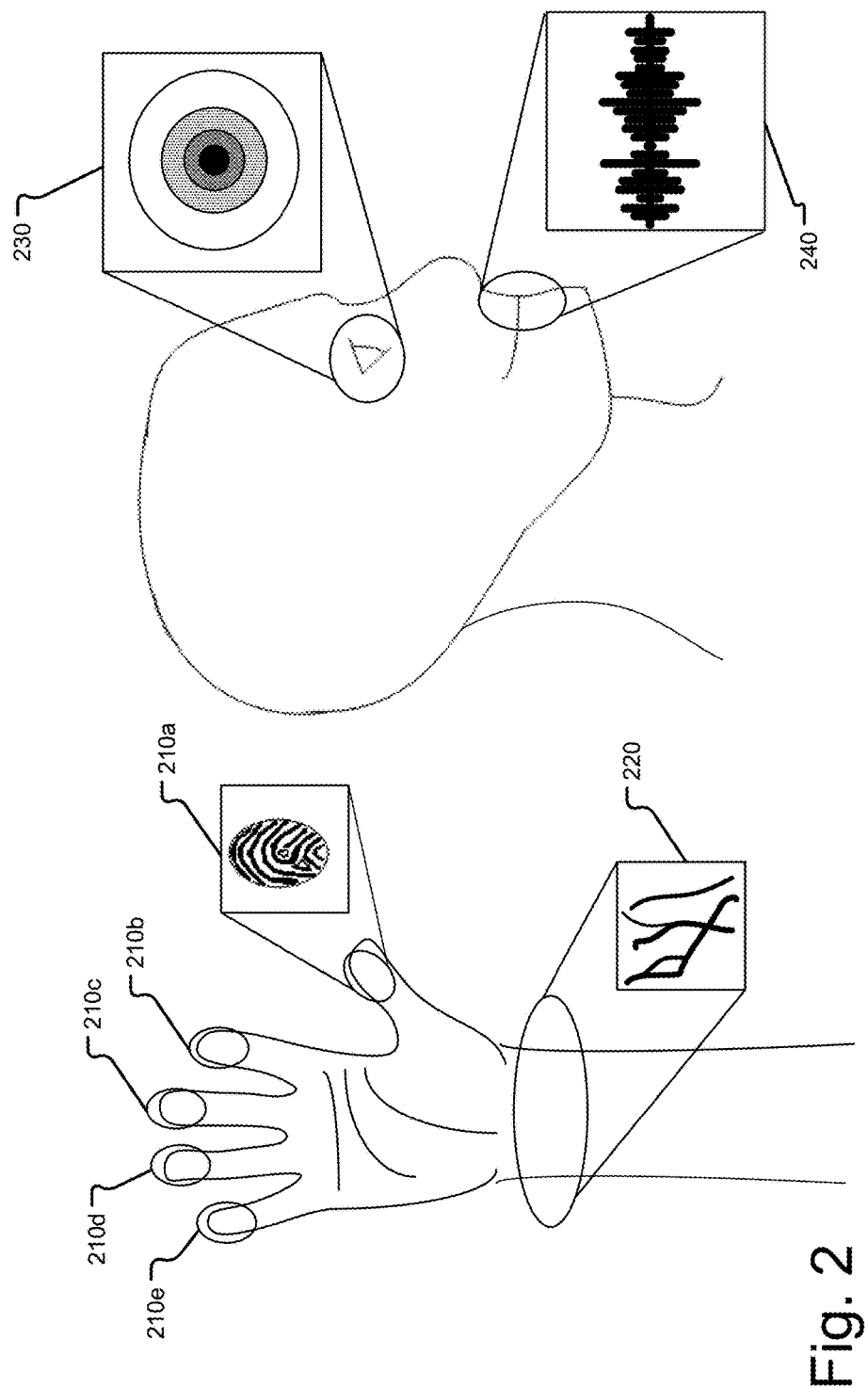
FIG. 2 is a diagram of example biometric markers.

FIG. 2 is a diagram of example biometric markers. Biometric markers are features of an individual's physiology that are capable of being used to identify that individual from amongst the population. Popularly used biometric markers are easily accessible physical features with patterns that are distinct to the individual. As will be appreciated, a device that reads the biometric markers interprets these patterns and stores them as the biometric dataset 160, which is used to authenticate the individual to various systems. As will also be appreciated, the algorithms used to compare a given biometric marker to a biometric dataset 160 stored by an authenticator 130 may look at various features of a given biometric marker and account for natural variation in the biometric feature itself or in how it was scanned by a biometric scanner 140, which may depend on the presented biometric feature, examples of which are detailed below.

Fingerprints 210*a-e* (generally, fingerprints 210) are an example of popularly used biometric markers that are based on the patterns of ridges found on the digits of individuals 120. In various aspects, a biometric scanner 140 that measures fingerprints 210 may be an optical scanner, comprising an array of photosensitive diodes (e.g., a digital camera) used to create an image of the fingerprint 210, or a capacitive scanner, comprising an array of conductive plates coupled via inverting operational amplifiers to detect changes in capacitance to a surface in contact with the ridges of a fingerprint 210 (or, inversely, not in contact with the valleys) to form a capacitance map of the fingerprint 210 being scanned. Fingerprint 210 scanning may need to account for dirt, sweat, injury, swelling, and positioning relative to the biometric scanner 140, among other factors.

A blood vessel geometry 220 is another example of a popularly used biometric marker, which is based on the patterns of blood vessels (e.g., veins, arteries, capillaries) as measured by an array of photosensitive diodes (e.g., a digital camera). The blood vessel geometry may be taken in several locations from the body of the individual 120, but patterns from the ventral sides of the wrists and from the retinas are most popularly used. Blood vessel geometry 220 scanning may need to account for changes in pigmentation (e.g., tanning), changes in hair cover, bruising and injury, dirt, sweat, tears, corrective or cosmetic lenses, growth, and positioning relative to the biometric scanner 140, among other factors.

An iris pattern 230 is a third example of a popularly used biometric marker, which is based on the patterns found in the irises surrounding the pupils in the eyes. In various aspects, iris patterns 230 may be scanned via color or grayscale imaging. Iris pattern 230 scanning may need to account for dilation of the pupil, corrective or cosmetic lenses, injury, motion of the eye, and positioning relative to the biometric scanner 140, among other factors.

To provide additional contrast to visually collected biometric datasets 160, such as, for example, those that include fingerprints 210, blood vessel geometry 220, or iris patterns 230, the biometric scanners 140 may provide additional light sources, such as, for example, a flash on a camera. Additionally, the biometric scanners 140 may use various ranges of frequencies of light (e.g., infrared, visible, ultraviolet) when a visual scan of the biometric marker is made. Visually collected biometric datasets 160 may be stored as image files of the biometric marker (e.g., bitmaps, Graphics Interchange Format (GIF) files, Joint Photographic Experts Group (JPEG) files, Portable Network Graphics (PNG) files), a pattern classification file (e.g., an Integrated Automated Fingerprint Identification System (IAFIS) features record), or a biometric data interchange format standard (e.g., files conforming to the International Committee for Information Technology Standards (INCITS), American National Standards Institute (ANSI), or International Standards Organization/International Electrotechnical Commission Joint Technical Committee (ISO/IEC JTC) 1/SC 37 formats). The format required may be specified in an authentication dataset 170 or the authentication requirements 175 of a remote portion 135b.

Vocal patterns 240 are yet another popularly used biometric marker, which are based on the frequencies and rhythms used by an individual 120 when speaking. In various aspects, the scanning of vocal patterns 240 may specify a code-word or phrase for the individual 120 to use when vocal patterns 240 are scanned so that vocal patterns 240 for specific words may be compared. In other aspects, the individual 120 may submit a large sampling of vocal patterns 240 during on-boarding so that general speech traits may be deduced, and thus removing the need for a particular code-word or phrase for authentication. The biometric dataset 160 for vocal patterns 240 may be stored as a sound file (e.g., a wave file, an MP3 file, a Free Lossless Audio Codec (FLAC) file), or as an image or video file via a spectrogram of the scanned vocal patterns 240 or Fourier transforms thereof. The scanning of vocal patterns 240 may need to account for illnesses (e.g., head colds, laryngitis), natural variations in speech, and background noise, among other factors. Different frequency ranges may be scanned (or filtered out) when using vocal patterns 240 to reduce the chance of background noise impacting the authentication of the individual 120.

One of ordinary skill in the art will appreciate that other physiological features than those discussed in relation to FIG. 2 may be used as biometric markers and that other example biometric scanners 140 are possible. For example, less easily accessible physical features may also be used as biometric markers, albeit with less convenience to the individual 120 or the authenticator 130. For example, while a fingerprint 210 is a popularly used biometric marker, footprints and toeprints are less popularly used due to a variety of factors that decrease ease of access to those features (e.g., amount of clothing worn over the feature, amount of dirt on the feature, flexibility and dexterity differences) and a comparative difference in size. Other biometric scanners 140 may measure typing patterns, handwriting, and shapes/patterns of body parts via pressure sensors, and via algorithms that measure rhythms of inputs. The examples given in relation to FIG. 2 are therefore to be taken as non-limiting illustrations of potential biometric markers, and therefore do not limit the scope of the present disclosure.

Figure 3:
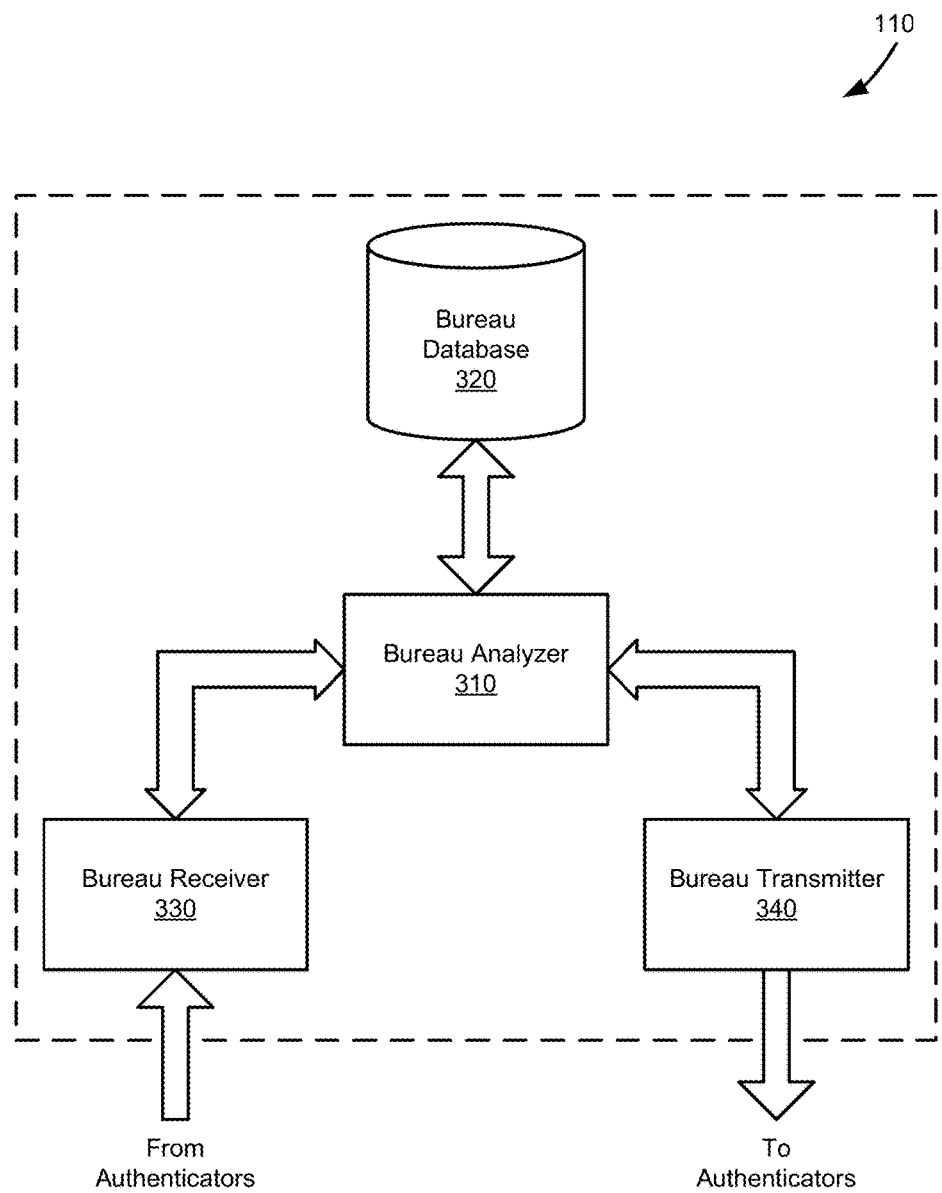
FIG. 3 is a block diagram illustrating example components of a bureau.

FIG. 3 is a block diagram illustrating example components of a bureau 110. As illustrated, a bureau analyzer 310 is in communication with a bureau database 320, a bureau receiver 330, and a bureau transmitter 340. In various aspects, each of these components may be implemented by a single computer device, such as that illustrated in FIG. 6, or via multiple computer devices in a distributed system.

Communications from and between portions of authenticators 130 are monitored by the bureau receiver 330, which are organized by the bureau analyzer 310 to build the meta dataset 180. The meta dataset 180 comprises access conditions related to historic usage information of each individual 120 and their associated biometric datasets 160, which are stored in the bureau database 320. The bureau analyzer 310 compares current usage information to the historic usage information according to various rules to determine when a potential use deviation has occurred, and will communicate with authenticators 130 via the bureau transmitter 340 when a potential use deviation is detected. Additionally, the bureau transmitter 340 is operable to transmit, on request, usage reports regarding how biometric datasets 160 are being used.

The bureau receiver 330 and bureau transmitter 340 are hardware devices for communication over a network. In various aspects, the bureau receiver 330 and the bureau transmitter 340 may be different aspects of a single transceiving device or separate communication devices dedicated to receiving and transmitting respectively. As will also be appreciated, more than one bureau receiver 330 or bureau transmitter 340 may be part of a bureau 110, and an array of communication devices may be employed. Because authenticators 130, or the portions thereof, may be communicated with the bureau 110 over the Public Switched Telephone Network (PSTN), which includes cellular telephone networks, microwave transmission links, fiber optic cables, and telephone cables, the communication devices that comprise the bureau receiver 330 and bureau transmitter 340 may be adapted for communication over various transmission media. For example, the communication devices may include lasers, photodiodes, network interface cards, and antennas that are adapted for communication via fiber optic signals, electrical signals, and radio signals at the appropriate frequencies or wavelengths and formatted to the relevant standards. One of ordinary skill in the art will be familiar with the relevant spectra and standards for communication via the various transmission media, and will adapt the hardware and firmware of the bureau receiver 330 and the bureau transmitter 340 accordingly.

The bureau database 320 is a memory device comprising computer readable storage media to store the meta datasets 180 related to the use of biometric markers. As will be understood by one of ordinary skill in the art, computer readable storage media are hardware devices used to store information and instructions in a computer readable format, and are distinct from transmission media and signals. Although illustrated as one component, the bureau database 320 may be implemented as an array of memory devices, for example, several hard drives (solid state or magnetic disk) in a Redundant Array of Independent Disks (RAID) configuration part of a Network Attached Storage (NAS) device to provide data redundancy and performance improvements over a single large capacity memory device.

The bureau analyzer 310 is operable to organize the messages received by the bureau receiver 330 to build the meta dataset 180 for how each biometric marker is being used for access control. When an individual 120 seeks to be authorized and presents a biometric marker to be scanned, the biometric scanner 140 will transmit its scan to a local system 150 or a remote system 155 to approve or deny access for the individual 120 to that system. In some aspects, the bureau 110 acts as a clearinghouse, such that any messages sent to a remote system 155 are passed through the bureau 110; being received by the bureau receiver 330 and being retransmitted by the bureau transmitter 340 to the remote system 155. In other aspects, such as when the system granting access is a local system 150, or when the bureau 110 does not act as a clearinghouse, separate messages are sent to the bureau 110 in addition to the transmission of the scan from the biometric scanner 140 to the system that uses the biometric marker for access control to inform the bureau 110 that the biometric marker is being used.

Additionally, the authenticators 130, independently of log in requests, may communicate with the bureau 110 to inform the bureau 110 of developments regarding the biometric datasets 160, such as, for example, a data breach that exposed biometric datasets 160 to identity thieves 125 or other nefarious parties, a new device or user being authorized to use biometric markers to access the system, the deletion of a biometric dataset 160, changes in authentication requirements 175, requests for a history report on use of a biometric maker, requests for additional available biometric datasets 160 that are used by other systems, etc.

When the bureau acts as a clearinghouse, the content of messages between local portions 135a and remote portions 135b may be ignored or examined. In aspects where the content is ignored, the meta dataset 180 may be built from an initial authentication dataset 170 from on-boarding and header information in subsequent communications. Header information includes data related to the location of the individual 120 when presenting the biometric marker, the time that the biometric marker is presented, the device to which the biometric marker is presented, and the system that the biometric marker is used to gain access to. By ignoring content and building the meta dataset 180 from header information, the bureau 110 may avoid the need of decrypting messages that include encrypted content and assure users of the privacy of their communications. In aspects where the content is examined in addition to the header information, however, the bureau analyzer 310 is further operable to build the meta dataset 180 based on what actions the individual 120 is taking with the system. As will be appreciated, when the contents of a message are encrypted, the bureau 110 may be given a key to decrypt (and, in some aspects, re-encrypt) the content so that it may be analyzed. In various aspects, the keys may be exchanged at the time of onboarding or at a later time (e.g., to replace an existing key or to set up encryption at the later time) by a local system 150 or by a remote system 155.

The bureau analyzer 310 is operable to compare current usage information, from a currently received communication, to historic usage information in the meta dataset 180 to determine when a potential use deviation has occurred. The bureau 110 uses various rules to determine whether a use deviation has occurred, and these rules are configurable on a client-by-client basis, so that different systems may set different effects for detecting use deviation. Example rules include, but are not limited to: whether multiple concurrent logins are allowed, permitted/denied locations of login (e.g., internet protocol (IP) address, business name, cell-tower derived coordinates, global positioning system (GPS) coordinates), time between logins at different locations, a number of communications within a given time period (e.g., indicating multiple failed log ins), types of actions attempted while logged in (e.g., large transfers of money), and whether the devices transmitting communications are previously known to the bureau 110.

The bureau analyzer 310 is further operable to generate reports and alerts on biometric marker usage when a use deviation is detected, or on request. When a request is received by the bureau receiver 330, the bureau analyzer 310 will compile a report on a given biometric marker and the access conditions surrounding the use of that biometric marker. For example, a user may request a report regarding a left iris pattern, and the bureau analyzer 310 will return a report, via the bureau transmitter 340, that indicates the devices that use the pattern of the left iris for access control, frequency of use of the left iris to gain access, how the left iris is stored (e.g., encryption, file type, file size), whether any use deviations have been detected in the past, whether data breaches have affected the biometric marker, etc. Similarly, when an alert for a use deviation is generated by the bureau analyzer 310, it is transmitted to a user device (in some aspects a different user device than the one from which the use deviation is detected on) by the bureau transmitter 340, and includes information related to what triggered the determination to generate an alert. For example, an individual 120 who logs into a first device in city A will be alerted when a biometric marker from that individual 120 is received from a second device located in city B, and will be alerted on the first device that an attempted login was received from a second device in a different location.

In various aspects, an alert may be provided to the local portion 135a of the authenticator 130. When an alert is transmitted to a local portion 135a, the alert will indicate what triggered the alert to be generated, for example, the metadata in an access attempt that differ from the meta dataset 180. The local portion 135a may respond to the alert by sending a command to the bureau 110 to accept or to reject the metadata as part of the meta dataset 180. For example, when the metadata indicate that the local portion 135a is an unknown device, such as, for example, a new cellphone, an alert may be sent and responded to, accepting the new device, and adding its identifier to the meta dataset 180 so that a subsequent alert will not be generated when the new device is used again. In an alternate example, when the metadata indicate that the local portion 135a is an unknown device, such as, for example, an attempt to log into the remote portion 135b by an identity thief 125, an alert may be sent and responded to, rejecting the unknown device so that the current and future attempts to log into the remote portion 135b will be rejected (or ignored) without additional alerts being generated.

In other aspects, an alert may be provided to the remote portion 135b of the authenticator 130. When an alert is transmitted to the remote portion 135b, the alert will indicated what triggered the alert to be generated and optionally includes a logout command for any local portions 135a associated with the individual 120 on the remote portion 135b. For example, the individual 120 may be logged into the remote portion via a cellphone using a fingerprint 210 that an identity thief 125 attempts to spoof on a desktop computer while the individual 120 is logged in. The bureau 110 will recognize two log in attempts using the same biometric marker as a use deviation, and will transmit an alert to the remote portion 135b. A logout command may be transmitted by the bureau 110 to log out the individual 120, or the remote portion 135b may automatically log out the individual 120 and identity thief 125, or transmit a request for secondary authentication before logging out either party and blocking access until the secondary authentication is received. Because if the identity thief 125 in the above example has spoofed the individual's device and biometric marker and the remote portion 135b may not know which party is the individual 120 and which is the identity thief 125, all access granted for the particular biometric marker will be terminated for the remote portion 135b, and the bureau 110 is operable to transmit the use deviation to other remote portions 135b so that the identity thief 125 cannot continue to use the biometric marker to gain access to the other accounts of the individual 120.

The use deviations and the access conditions surrounding the use of the biometric markers (time, frequency, devices, location, file type, file size, encryption, etc.) may also be transmitted in a report generated by the bureau 110 to either the local portion 135a or the remote portion 135b. In various aspects, the reports may be organized according to the individual 120 (e.g., all biometric markers used by the individual), the domain to which access is granted (e.g., all biometric markers used by the remote portion 135b for access control), the biometric marker in general (e.g., all thumbprints for a given remote portion 135b, thumbprints in across multiple remote portions 135b), or the specific biometric marker (e.g., a thumbprint for a particular individual 120 at one or more remote portions 135b).

For example, an individual 120 may request a report from the bureau 110 (in a paper or electronic format) to learn about how various systems and the individual 120 are using or sharing the individual's biometric markers. The individual 120 may learn that a left thumbprint is used on six systems for access control, a right thumbprint is used by one system, and a voiceprint is used by two systems. The individual 120 may also be presented with the frequency at which those biometric markers are presented for granting access, a success rate of presentation, and whether any use violations have been detected that are associated with those markers. This allows individuals 120 to see and verify the systems that use their biometric markers for access control. For example, an individual 120 may see that a loan was applied for using a biometric marker for identity confirmation in a country that the individual 120 has never visited, so that the bank may be contacted for fraud protection purposes. In another example, the individual 120 may be sent the report without making a request when a data breach at a system has exposed the individual's biometric marker, so that the individual 120 may re-authenticate and provide a different biometric marker at that system and any other systems that use the effected biometric marker to proactively prevent unauthorized access. The bureau 110 may also, with the individual's consent or until the individual 120 overrides the bureau 110, notify systems in communication with the bureau 110 that a given biometric marker has been affected by a data breach and that additional or alternative authentications should be used to grant access when creating or accessing accounts or profiles. In various aspects, the bureau 110 will automatically transmit these reports to a registered address or device when a use deviation or data breach occurs, or the individual 120 or systems may request biometric marker usage reports on demand.

Figure 4:
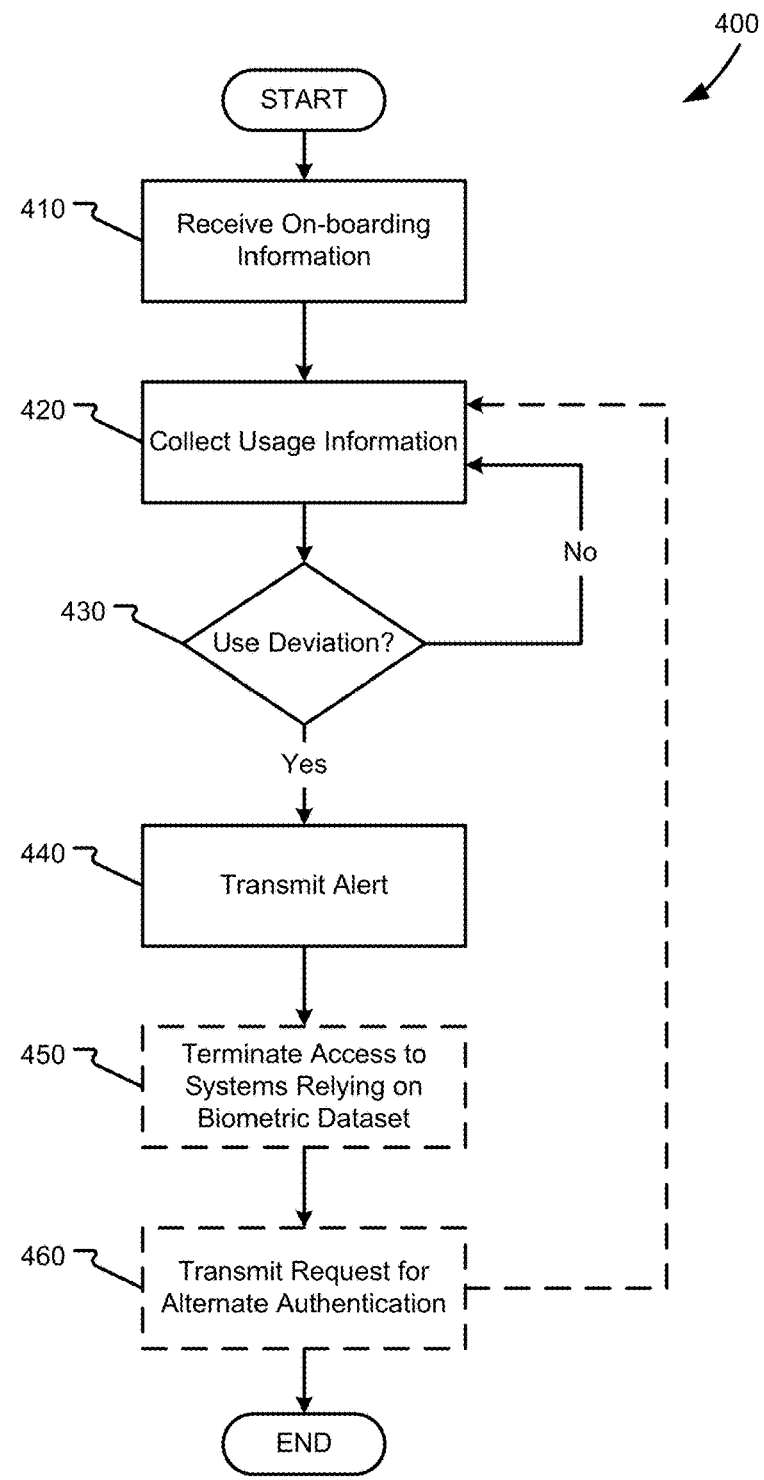
FIG. 4 is a flow chart showing general stages involved in an example method for improving the security of systems that use biometric markers for access control.

FIG. 4 is a flow chart showing general stages involved in an example method 400 for improving the security of systems that use biometric markers for access control. Method 400 begins at OPERATION 410, where on-boarding information is received by the bureau 110 from an authenticator 130. In various aspects, the on-boarding information includes the authentication dataset 170 for a given individual 120 and authenticator 130, which includes metadata on how the individual 120 was on-boarded, how the individual 120 was authenticated for on-boarding, the identity of the individual 120, the identity of the system that the individual 120 has been granted access to via the on-boarded biometric dataset 160, and information related to the biometric marker and the biometric dataset 160.

Method 400 proceeds to OPERATION 420, where usage information and access conditions are collected for the biometric marker, and the meta dataset 180 for the biometric marker is built and kept up to date. The bureau 110 tracks various aspects of the access conditions for the use of biometric markers and the systems that use the biometric markers for access control to build and update the meta dataset 180. In various aspects, the collection of usage information to build/update the meta dataset 180 may be passive or both passive and active. Passive collection of usage information occurs when the bureau 110 monitors communications from a local portion 135*a* of an authenticator 130 to the remote portion 135*b* of the authenticator 130 (or vice versa). Active collection of usage information occurs when the bureau 110 requests specific information from an authenticator 130 to which the authenticator 130 responds, or when an authenticator 130 transmits information (unprompted) to the bureau 110. For example, the bureau 110 may passively collect information regarding a time of login and the remote systems 155 to which the individual 120 is requesting access, actively request a time of login and the local systems 150 to which the individual 120 is requesting access, and actively receive a notice of a data breach from a remote system 155.

At DECISION 430 it is determined whether a use deviation for the biometric marker is detected. Use deviations are determined by the bureau 110 by comparing current usage information to historic usage information. In various aspects, multiple concurrent logins, new location of login (e.g., internet protocol (IP) address, business name, cell-tower derived coordinates, global positioning system (GPS) coordinates), unusual time of login (e.g., at 4 am for the typical time zone for the individual 120), multiple failed attempts at login, actions attempted while logged in (e.g., large transfers of money), and unknown devices attempting login may be treated as a basis for a use deviation, although other bases may be defined as potential use deviations and several bases may be combined when defining a use deviation.

For example, logins from two different locations that use biometric datasets 160 for the same individual 120 may be deemed a use deviation if the logins occur within a set period of time. For example, if the bureau 110 notes that an individual 120 logs in to a system from San Francisco at noon and logs in to a system from New York thirty minutes later, it will be determined that a use deviation has occurred. Conversely, if the bureau 110 notes than an individual 120 logs into a system from San Francisco on Monday and logs into a system from New York on Tuesday, it may be determined that no use deviation has occurred, as enough time has passed for the individual 120 to have relocated from one location to the other (a use deviation may still have occurred, albeit based on other reasons).

When it is determined that a use violation has occurred in DECISION 430, method 400 proceeds to OPERATION 440. Otherwise, method 400 returns to OPERATION 420, where additional usage information is collected and further checks of use deviation are made.

At OPERATION 440 an alert is transmitted. In various aspects, the alert may be transmitted to the device from which access was sought, a device that has previously been granted access, or a remote system 155 to which access is being sought when a use deviation has been determined to have occurred. For example, when attempts to access a remote system 155 of an online bank are determined to be a use deviation (e.g., the attempts are from an unknown location, are simultaneous with another device, etc.), the alert may be transmitted to both the bank and to a device known to be associated with the account owner. In another example, when a remote system 155 of a store (e.g., a general store, a grocery store, an online store) learns of a data breach that may have included biometric datasets 160 and communicates this to the bureau 110, the bureau 110 may transmit an alert to devices associated with individuals 120 who provided the biometric datasets 160 and any other remote systems which use those biometric datasets 160 so that countermeasures may be taken to prevent an identity thief 125 from impersonating an individual 120 with the biometric dataset 160. The alert may be transmitted via the network as an email message, a text message (e.g., via the short message service (SMS), multimedia message service (MMS), or a proprietary standard), a function call to an application used by a local portion 135*a* to access a remote portion 135*b* (e.g., an email client, a proprietary "app," a Rich Site Summary (RSS) feed), or a telephone call.

Access to systems that used the biometric markers as access control is terminated at OPTIONAL OPERATION 450 as a potential countermeasure to identity thieves 125 when a use deviation is detected. Access may be terminated on either the user-side or the provider-side of a system. For example, the bureau 110 may contact a local system 150 to log out of a master system (e.g., an operating system) and/or any subsystems on a device which was part of a use deviation. The bureau 110 may also contact a remote system 155, involved or uninvolved in a use deviation, to log the individual 120 out of its systems or require additional security measures when the individual 120 next tries to gain access. For example, when a use deviation is detected from a cellphone trying to access an email account remotely, the bureau 110 may contact the email service provider to alert it of the use deviation, but may also contact an online bank associated with the individual 120 to alert it of the use deviation, so that the online bank may request additional verification steps when some attempts to log in to the account for the individual 120. In various aspects, the alert sent by the bureau 110 also includes a logout command so that any open sessions for which access has been granted are closed.

In various aspects, when access is terminated to a master system, such as, for example, an operating system, access will also be terminated to any subsystems, such as, for example, an email client or online banking application being run by the operating system. The subsystems to which access is terminated may use the same biometric datasets 160 for which a use deviation was detected, or may use other datasets for access control (e.g., a different biometric dataset for the same or a different biometric marker, a username/password pair, a pattern).

At OPTIONAL OPERATION 460 the bureau 110 may transmit a request for alternate authentication from the individual 120 as a potential countermeasure to identity thieves 125 when a use deviation is detected. In various aspects, alternate authentication includes, but is not limited to: a different biometric marker (e.g., instead of a first fingerprint 210a: a second fingerprint 210b, a blood vessel geometry 220, an iris pattern 230, a vocal pattern 240, etc.), a password, a PIN, a security pattern, answers to a security question, a CAPTCHA (Completely Automated Public Turing test to tell Computers and Humans Apart) or other Turing test, or a confirmation communication (e.g., a multifactor authentication step such as phone call, a text message, or an email). Additionally, the request for alternate authentication may be sent to the device from which the use deviation was detected or a secondary device associated with the individual 120 (e.g., when the use deviation or an individual 120 is detected from a desktop computer, the desktop computer or a cellphone associated with the individual 120 may receive the request). When an individual 120 fails to provide a correct alternate authentication, access to the system will be terminated. Alternatively, when the individual provides a correct alternate authentication, access to the system will be re-granted (or maintained if the access had not yet been terminated). As will be appreciated, a response window may be set so that if the individual does not respond to the request for alternate authentication within a given time period, the lack of response will be treated as an improper response or a confirmation that a use deviation occurred. Similarly, when a confirmation communication is responded to, the contacted individual 120 may agree that a use deviation has occurred or disagree that a use deviation has occurred, and access may be terminated, re-granted, or maintained as appropriate.

In various aspects, OPTIONAL OPERATION 460 may be performed in conjunction with, or instead of OPTIONAL OPERATION 450 and may be performed before, after, or simultaneously with OPTIONAL OPERATION 450. For example, an individual may be prompted for alternative authentication before access is terminated, and access will only be terminated if improper alternative authentication or no authentication is received within a time window, at which time method 400 concludes, otherwise method 400 returns to OPERATION 420 when acceptable authentication is received. In aspects where access is terminated before prompting for alternate authentication, after the individual has provided an acceptable alternate authentication in OPTIONAL OPERATION 460, the individual 120 will be re-granted access to the system to which access was terminated in OPTIONAL OPERATION 460, and method 400 returns to OPERATION 420. If the individual 120 does not provide an acceptable alternative authentication, or agrees that a use deviation has occurred, or method 400 does not perform OPTIONAL OPERATION 460, method 400 then concludes.

Figure 5:
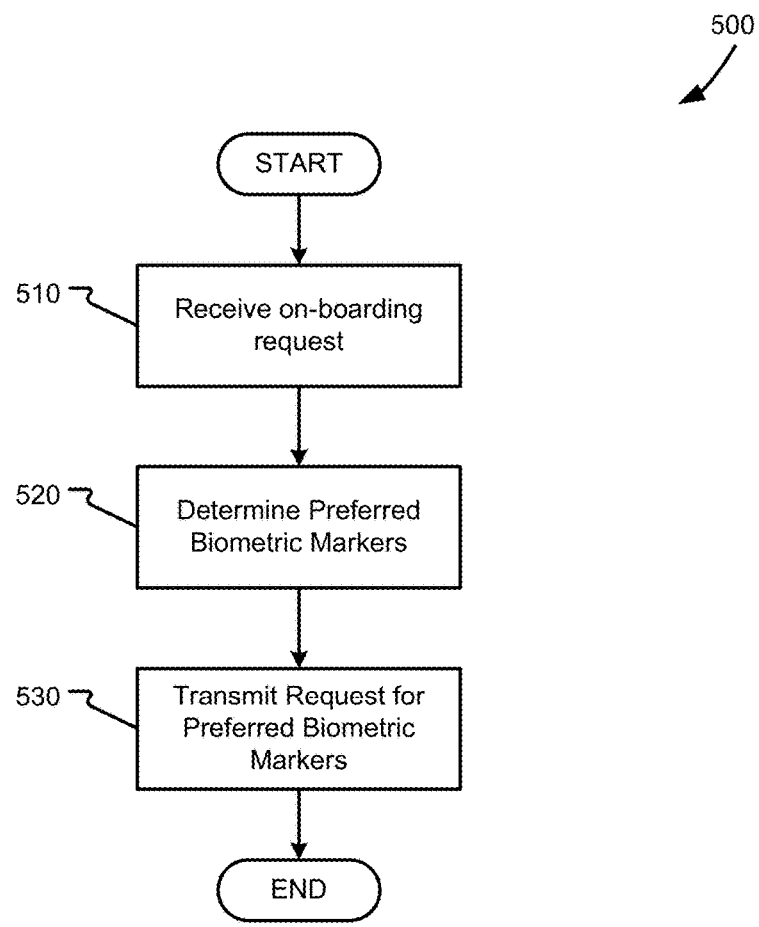
FIG. 5 is a flow chart showing general stages involved in an example method for improving the efficiency and speed of on-boarding for systems that use a biometric marker for access control.

FIG. 5 is a flow chart showing general stages involved in an example method 500 for improving the efficiency and speed of on-boarding for systems that use a biometric marker for access control.

Method 500 begins at OPERATION 510, where an on-boarding request is received. An on-boarding request is made when an individual 120 attempts to set up a new account that uses a biometric marker as an access control or attempts to add (or replace) a biometric marker as an access control to an existing account. For example, as a security measure, a system may request a new biometric marker to be used if the bureau 110 has alerted the system that the biometric dataset 160 for a previous biometric marker has been compromised (e.g., a security breach has occurred, multiple use deviations have occurred) In various aspects, the onboarding request may originate from a local system 150 or a remote system 155, or the bureau 110 on behalf of another system. In another example, an office, such for example, a bank or a Department of Motor Vehicles, may wish to identify an individual 120 without relying on identification papers (e.g., passport, driver's license, birth certificate), and will need to retrieve an already on-boarded biometric dataset 160 from a trusted third party to compare to the biometric markers of the individual 120. Identifying individuals without identification papers may be particularly useful in industries that deal with non-human individuals (e.g., animal shelters, kennels, veterinarian offices), disaster relief when identification papers may be unavailable, and the identification of individuals who otherwise lack the capacity to respond to requests for identification papers (e.g., babies, the mentally disabled, the dead).

At OPERATION 520 the bureau 110 determines a preferred biometric marker to use as the access control for the system for which the individual 120 is on-boarding. In various aspects, the preferences may be those of the individual 120, those of the system that the individual is onboarding to, or a combination of the two. For example, a remote system 155, for which the individual 120 is setting up a new account, may prefer multifactor authentication of both a username/password pair and a scan of a fingerprint 210. Continuing the example, the individual 120 (or the bureau 110 on behalf of the individual 120) may prefer to use a second fingerprint 210b instead of a first fingerprint 210a when using a fingerprint scanner, due to a prior data breach that exposed a biometric dataset 160 for the first fingerprint 210a.

The preferences may set a number of biometric markers to use in different circumstances, so that, for example, access to an email server or local device may use one biometric marker, but access to an online bank's remote system 155 uses multiple biometric markers (e.g., a fingerprint 210 and a vocal pattern 240). The preferences for subsystems may also set that the same biometric marker may or may not be used as a master system. For example, when an individual gains access to a master system of a smartphone's operating system via a first fingerprint 210a, a subsystem of an online banking application on that smartphone may have preferences as to whether the first fingerprint 210a can also be used as a biometric marker to gain access to the remote system 155 of the online bank. Continuing the example, the preferences may allow the individual 120 to re-present the first fingerprint 210a, to enable the application to use the biometric dataset 160 from login to the smartphone to automatically log in to the remote system 155, or may require that the individual present a different biometric marker than used to log in to the master system or a different subsystem (e.g., an email client).

In various aspects, the preferences also include the authentication requirements 175 of a remote portion 135b of an authenticator 130. The authentication requirements 175 set what details and format a biometric dataset 160 must have so that a device is allowed or disallowed as a local portion 135a to the authenticator. Depending on the authentication requirements 175 and the capabilities of various components of a local device that are usable as biometric scanners (e.g., a camera, a microphone, a touch screen), the preferences may select one biometric marker over another. For example, when an individual 120 is attempting to use a smartphone as a local portion 135a when logging in to a remote system 155, the authentication requirements 175 may change the remote system's initial preference of a fingerprint 210 to a preference for a vocal pattern 240 due to the low resolutions of the smartphone's camera and touchscreen (or higher fidelity of the smartphone's microphone).

Method 500 then proceeds to OPERATION 530, where a request for the preferred biometric marker is transmitted. In various aspects, the request is transmitted to a local portion 135a of an authenticator 130 to prompt an individual 120 to submit a biometric marker to a biometric scanner 140 so that an initial biometric dataset 160 can be collected to onboard the individual 120 or a new biometric dataset 160 is collected to replace a prior biometric dataset 160. In other aspects, a request is sent to a trusted third system to share a biometric dataset 160 for which the individual 120 is already on-boarded. For example, when a bank is remotely onboarding an individual 120 for access to its remote systems 155, it may not trust that the person seeking access is actually the individual 120, and instead will contact the bureau 110 to locate a third party (e.g., an employer, another bank, a government agency) who can provide the biometric dataset 160 for which the bank's remote systems 155 will request the (alleged) individual 120 to present the biometric marker for. By using a trusted third party, a remote system 155 may rely on an authentication for a previous onboarding as its own authentication of the individual for onboarding at its systems. In another example, when the individual 120 lacks identification documents, an office may consult the bureau 110 to locate another system that had a copy of a biometric dataset 160 that the individual 120 may be compared against at the office. Method 500 then concludes.

Figure 6:
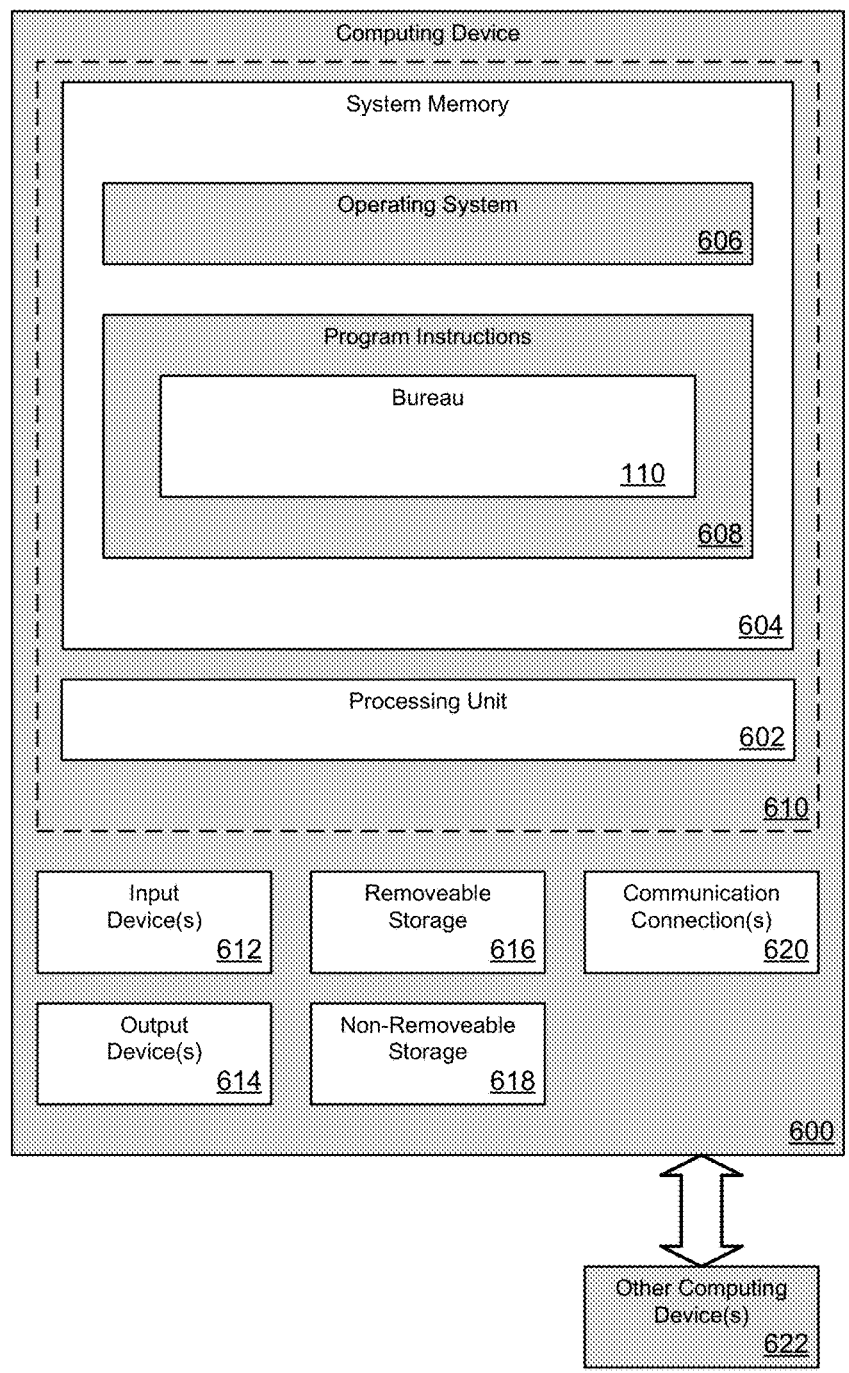
FIG. 6 is a block diagram illustrating physical components of an example computing device with which aspects may be practiced.

FIG. 6 is a block diagram illustrating physical components of an example computing device with which aspects may be practiced. The computing device 600 may include at least one processing unit 602 and a system memory 604. The system memory 604 may comprise, but is not limited to, volatile (e.g. random access memory (RAM)), non-volatile (e.g. read-only memory (ROM)), flash memory, or any combination thereof. System memory 604 may include operating system 606, one or more program instructions 608, and may include sufficient computer-executable instructions for a bureau 110, which when executed, perform functionalities as described herein. Operating system 606, for example, may be suitable for controlling the operation of computing device 600. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more output device(s) 614 (e.g., display, speakers, a printer, etc.).

The computing device 600 may also include additional data storage devices (removable or non-removable) such as, for example, magnetic disks, optical disks, or tape. Such additional storage is illustrated by a removable storage 616 and a non-removable storage 618. Computing device 600 may also contain a communication connection 620 that may allow computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system for improving speed, efficiency, and security of authenticators that use biometric markers for access control, comprising:
   a processor; and
   a memory device including instructions, which when executed by the processor are operable to provide:
      a bureau, located remotely from the authenticators, for collecting metadata on the biometric markers being used for access control and managing use of the biometric markers, wherein the bureau further comprises:
         a bureau receiver, in communication with the authenticators, to receive communications from the authenticators regarding access conditions for using the biometric markers for access control;
         a bureau database, to store a meta dataset including information regarding the access conditions for using the biometric markers for access control;
         a bureau analyzer to extract the metadata from the communications to build the meta dataset, determine a use deviation for a biometric marker associated with a biometric dataset for a given individual when compared to the meta dataset, and prevent future use of the biometric marker associated with the given biometric dataset according to the use deviation; and
         a bureau transmitter, in communication with the authenticators and the bureau analyzer, to transmit an alert to the authenticators when the use deviation is detected to prevent the future use of the biometric marker associated with the given biometric dataset.

2. The system of claim 1, wherein the bureau is further operable to generate reports regarding the access conditions for using the biometric markers, wherein the reports specify an organization scheme chosen from:
   organized by an individual;
   organized by a domain to which access is granted;
   organized by a general biometric marker in general for the domain; and
   organized by a specific biometric marker from the individual.

3. The system of claim 1, wherein the alert requests a different biometric marker from an individual than the biometric markers involved in the use deviation.

4. The system of claim 1, wherein the meta dataset is built from an initial on-boarding of the biometric markers for granting access control.

5. The system of claim 1, wherein the meta dataset is extracted from header information in the communications.

6. The system of claim 1, wherein an authenticator comprises a local portion, from which the bureau receives datasets for the biometric markers, and a remote portion, to which the datasets for the biometric markers grant access.

7. The system of claim 6, wherein the bureau acts as a clearing house, forwarding messages between the local portion and the remote portion.

8. The system of claim 6, wherein authentication requirements for the remote portion are transmitted by the bureau to the local portion to enable the local portion to transmit the datasets for the biometric markers in formats acceptable to the remote portion.

9. A method for improving speed, efficiency, and security of authenticators that use biometric markers for access control, comprising:
   receiving on-boarding information at a bureau, including a biometric dataset for a biometric marker of an individual, and an authentication dataset, specifying how the individual was identified for on-boarding;
   collecting, at the bureau, current usage information of the biometric dataset in relation to a remote system to build a meta dataset, wherein the meta dataset comprises historic usage information related to access conditions surrounding usage of the biometric marker;

determining, based on comparing the current usage information to the historic usage information, whether the current usage information indicates a deviation in use of the biometric marker associated with the biometric dataset for the remote system for the individual;

preventing future use of the biometric marker associated with the given biometric dataset according to the use deviation;

transmitting an alert of the use deviation when the current usage information indicates the use deviation to prevent the future use of the biometric marker associated with the given biometric dataset for the remote system; and continue collecting usage information when the current usage information does not indicate the use deviation.

10. The method of claim 9, further comprising transmitting the alert to the individual.

11. The method of claim 10, wherein the alert includes a request for an alternate authentication from the individual.

12. The method of claim 11, wherein the alternate authentication from the individual is chosen from:
   a password;
   a personal identification number;
   a pattern;
   a security question and response pair; and
   a different biometric marker.

13. The method of claim 9, further comprising transmitting the alert to all remote systems known to the bureau to use the biometric marker involved in the deviation in use of the biometric marker.

14. The method of claim 9, wherein the deviation in use is a data breach of the remote system.

15. The method of claim 9, wherein the remote system includes authentication requirements, specifying the access conditions required by the remote system to accept the biometric dataset to grant access to the remote system, which are transmitted to the individual by the bureau to ensure that the authentication dataset meets the authentication requirements.

16. The method of claim 9, further comprising:
   providing, from the bureau to the individual, a list of remote systems that use a given biometric dataset.

17. A system for improving speed, efficiency, and security of authenticators that use biometric markers for access control, comprising:

a memory;

a remote portion of an authenticator, including a remote system to which access is granted via a biometric dataset; a local portion of the authenticator, including a biometric scanner operable to scan the biometric markers to produce the biometric dataset, wherein the local portion is in communication with the remote portion via a network to request access to the remote system; and a bureau disposed between the local portion and the remote portion, monitor communications between the local portion and the remote portion over the network to collect a meta dataset on access conditions for how the biometric dataset is used, wherein the meta dataset includes information on a location where the local portion is located when access to the remote system is requested, a time when the access to the remote system is requested, and how the biometric dataset was onboarded and associated with an individual for the remote system; wherein the bureau determines from the communications between the local portion and the remote portion that a use deviation has occurred for a biometric marker associated with the biometric dataset when the communications include metadata that do not match the information stored in the meta dataset to prevent future use of the biometric marker associated with the given biometric dataset according to the use deviation, and generate an alert in response to the use deviation to prevent the future use of the biometric marker associated with the given biometric dataset.

18. The system of claim 17, wherein the alert is transmitted by the bureau to the local portion of the authenticator and indicates the metadata that did not match the information stored in the meta dataset.

19. The system of claim 18, wherein the bureau is operable to receive from the local portion a command to accept the use deviation as acceptable, wherein the metadata that did not match the information stored in the meta dataset is added to the meta dataset.

20. The system of claim 17, wherein the alert is transmitted by the bureau to the remote portion of the authenticator with a command to terminate an access granted to the remote portion by a biometric marker in response to the use deviation.

* * * * *